Aug. 13, 1957 S. M. LITTLE 2,802,399
ROCKET LAUNCHER

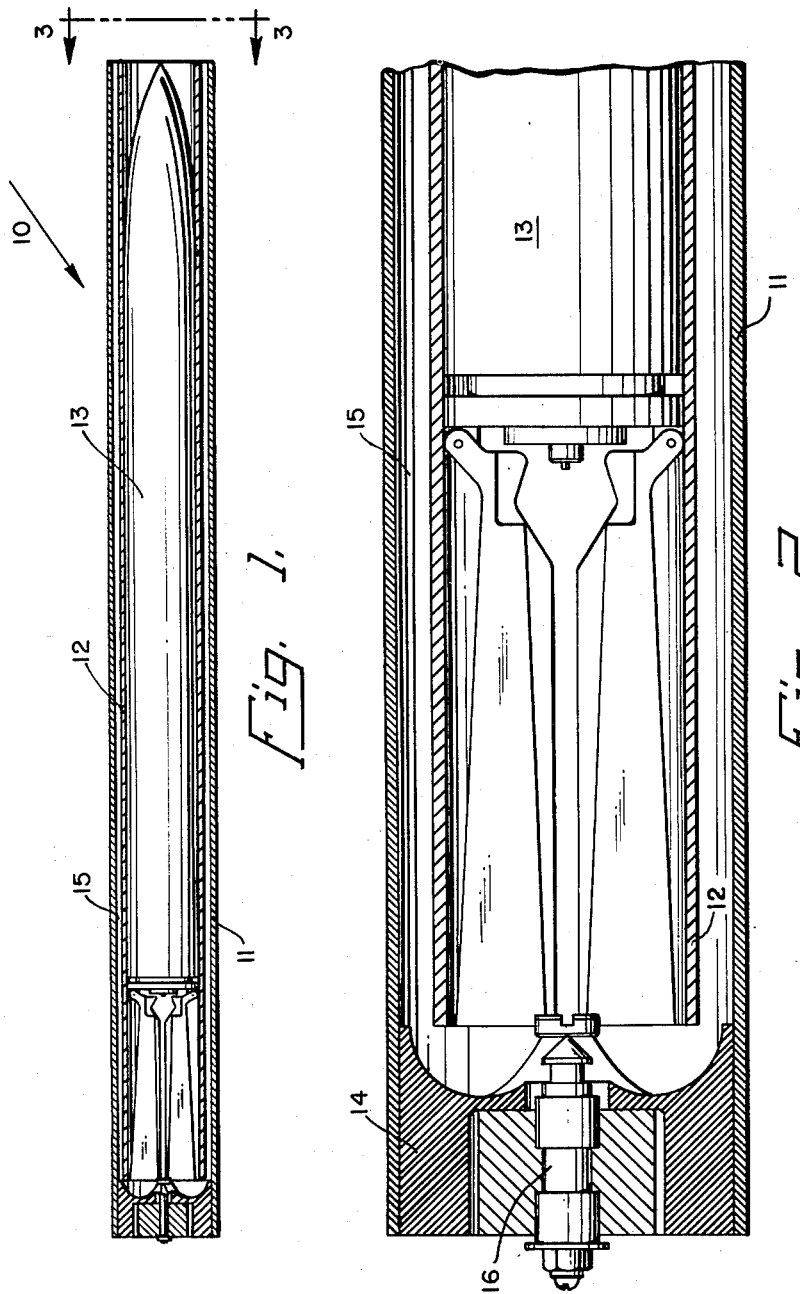

Filed Nov. 30, 1953 2 Sheets-Sheet 2

INVENTOR.
STEVEN M. LITTLE
BY
ATTORNEYS

United States Patent Office 2,802,399
Patented Aug. 13, 1957

2,802,399
ROCKET LAUNCHER

Steven M. Little, China Lake, Calif., assignor to the United States of America as represented by the Secretary of the Navy Application November 30, 1953, Serial No. 395,328

5 Claims. (Cl. 89—1.7)

(Granted under Title 35, U. S. Code (1952), sec. 266)

The invention described herein may be manufactured and used by or for the Government of the United States of America for governmental purposes without the payment of any royalties thereon or therefor.

The present invention relates to rocket launchers and more particularly to restricted breech, forward-venting launchers.

The design of certain rocket launching craft, as, for example, various rocket carrying aircraft, necessitates internal rocket stowage with the result that some arrangement must be employed for exhausting the rocket propulsion gases outboard of the launching craft. In certain of such rocket launching installations, as where launching tubes are mounted in the nose of an airplane, it has been found to be either impossible or impractical to employ open breech launching tubes in combination with deflector elements for directing the exhaust jets, flowing through the breech end of the launching tubes, outboard of the aircraft. Resort has been had, therefore, to restricted breech, forward-venting launching arrangements wherein, for example, the after end of the launching tube is closed by a breech plug and the tube itself is of somewhat larger diameter than the diameter of the rocket casing and is formed with rails or lands to provide for guidance of the rocket and for exhaust passages between the rocket casing and the launching tube. Such prior forward-venting launching arrangements, however, resulted in extensive damage to the rocket fins owing to the turbulence created by the inter-action of the nozzle gases and venting gases and to the corrosive effect of the hot venting gases on the fins as such venting gases flowed past the fins toward the muzzle end of the launching tube. Moreover, in light-weight low pressure rockets, the thin-walled aluminum tubes which comprise the body of such rockets were subject to damage by the direct action of the heat and pressures resulting from the hot gases.

The present invention avoids the disadvantages which have been associated with the prior forward-venting rocket launchers by providing a composite launching tube consisting of an interior rocket guiding tube and an exterior exhaust tube having at least some portions thereof spaced from the outer surface of the interior tube. The after end of the exhaust tube extends somewhat beyond the breech end of the guidance tube and is closed by a breech plug assembly provided with deflecting surfaces for directing the exhaust gases, flowing through the breech end of the guidance tube, into the exhaust spaces between the exterior tube and the interior tube whereby the nozzle gases may be exhausted from the forward end of the launcher without flowing past the rocket fins or interacting with the gases issuing from the rocket nozzles to create a turbulence which occurrences have, heretofore, caused extensive damage to the fins.

In accordance with the foregoing it is an object of the present invention to provide a restricted breech, forward-venting rocket launching tube.

Another object of the invention is to provide a forward-venting rocket launching tube wherein the forwardly flowing venting gases are separated from the rocket nozzle gases whereby to prevent the venting gases from interacting with the nozzle gases and to prevent the venting gases from flowing past the rocket fins.

Still a further object of the invention is to provide a forward-venting rocket launcher as in the foregoing wherein there is provided a composite launching tube including an interior tube to provide guidance for the rocket and an exterior tube having portions spaced from the interior tube and having its after end closed by a breech plug assembly for directing the rocket nozzle gases into the exhaust spaces between the exterior tube and the interior tube whereby the forwardly flowing venting gases will be prevented from flowing over the rocket fins and from interacting with the gases issuing from the rocket nozzles.

Other objects and many of the attendant advantages of the present invention will become apparent from the following detailed description had in conjunction with the annexed drawings wherein:

Fig. 1 is a longitudinal sectional view of the composite forward-venting launching tube of the present invention having a rocket housed therein;

Fig. 2 is an enlarged longitudinal sectional view of the after end of the launching tube of Fig. 1;

Figure 3:
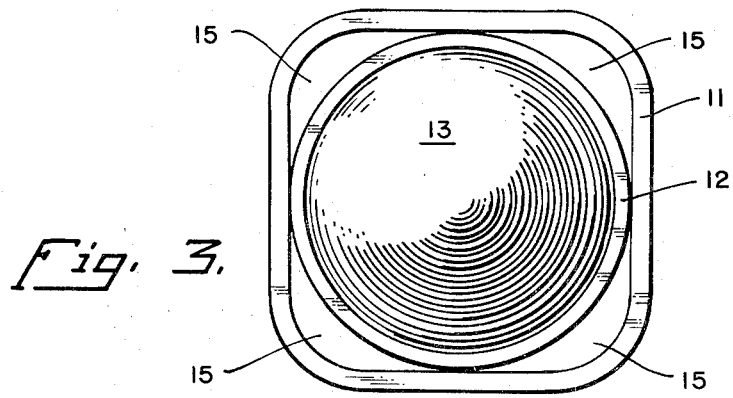
Fig. 3 is a muzzle end view of the present composite launching tube.
Figure 4:
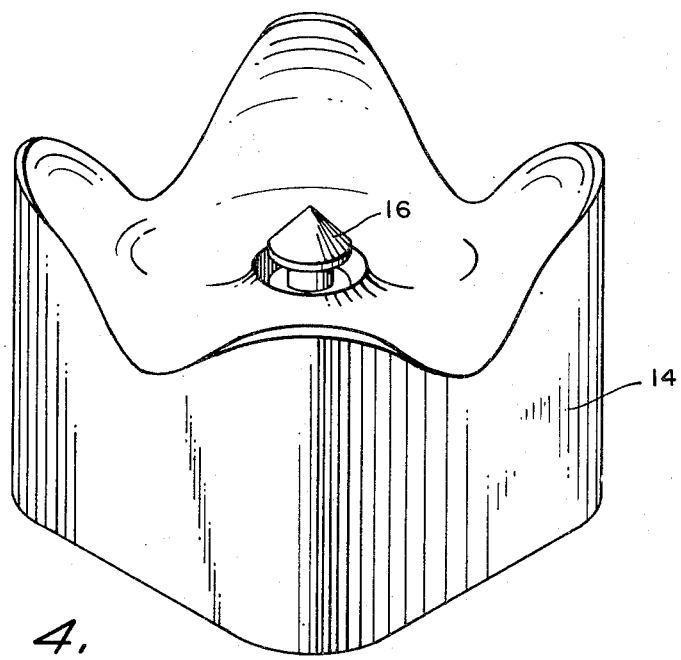
Fig. 4 is a perspective view of the breech plug assembly.

Referring now to the drawings and more particularly to Fig. 1 there is illustrated at 10 a composite, restricted-breech, forward-venting rocket launching tube comprising an exterior, or exhaust, tube 11 and an interior tube 12 which may be cylindrical in cross-section as shown in Fig. 3 and which has an internal diameter substantially equal to the exterior diameter of the casing of the rocket 13 to be launched for providing guidance for the rocket. The breech end of the interior, or rocket guiding tube 12, as more clearly shown in Fig. 2, terminates somewhat short of the after end of the outer, or exhaust tube 11, the latter having fixed within its after end a breech plug assembly 14. Exterior tube 11 may be substantially square in cross-section as shown in Fig. 3 or may have any other suitable cross-section which will provide for a plurality of longitudinally extending flow passages 15 between it and the outer surface of the inner tube 12. Breech plug 14 has its forward face concaved in the manner illustrated in Fig. 4 whereby to provide an arcuate deflecting surface for directing the gases issuing from the nozzles of rocket 13 into the exhaust spaces 15. The forward ends of exhaust spaces 15 are open to atmosphere whereby the exhaust gases may be vented off at the forward end of the rocket tube. Breech plug assembly 14 may include a stop member 16 having a conical end surface for positioning or limiting the rearward movement of the rocket 13 in the guide tube 12.

It will be apparent from the foregoing that the present invention provides a relatively simple, forwardly-vented rocket launching tube which will be effective to prevent the venting gases from flowing forwardly past the fins of the rocket and thus prevent damage to the fins arising from the excessive heat of the exhaust gases and from the turbulence created by the interaction of the nozzle gases and venting gases as has occurred in prior art forward venting-rocket launching tubes.

Obviously, many modifications of the present invention are possible in the light of the above teachings. It is therefore to be understood that within the scope of the appended claims the present invention may be practiced otherwise as specifically described herein.

What is claimed is:

1. A forward-venting rocket launching device comprising a first thin-walled, open-ended cylindrical tube for providing launching guidance for a rocket, a second thin-walled tube of non-circular cross-section surrounding the first tube, said second tube being open to the atmosphere at its forward end and having at least two lines of contact and connection with said first tube to provide strength and support for the assembly and to provide at least two longitudinally extending venting passageways between the walls of the two tubes, the after end of said second tube being closed by a breech plug assembly and extending beyond the open after end of said first tube whereby gases developed by a rocket launched in said first tube are directed by said breech plug assembly into said tubular venting passageways to be vented at the forward ends thereof.

2. The arrangement according to claim 1 wherein the forward ends of said tubes are substantially coextensive.

3. The arrangement according to claim 1 wherein said first tube is cylindrical and the second tube is substantially square in cross-section whereby to provide four of said longitudinally extending venting passageways.

4. The arrangement according to claim 1 wherein said breech plug assembly is provided with deflecting surfaces for directing the exhaust gases issuing from the rocket nozzles into said venting passageways.

5. The arrangement according to claim 4, wherein said breech plug assembly is further provided with a forwardly protruding support platform for engaging a rocket assembly to support and hold said rocket assembly entirely within said first tube prior to launching, whereby exhaust gases are less apt to cause damage to the rocket structure.

References Cited in the file of this patent

UNITED STATES PATENTS

| 785,644 | Unge | Mar. 21, 1905 |
| 2,478,774 | Meinel | Aug. 9, 1949 |

FOREIGN PATENTS

| 601,830 | France | Dec. 11, 1925 |
| 611,075 | France | June 26, 1926 |
| 611,076 | France | June 26, 1926 |
| 832,464 | France | July 4, 1938 |
| 612,997 | Great Britain | Nov. 19, 1948 |